(12) United States Patent
Overcash

(10) Patent No.: US 7,869,369 B2
(45) Date of Patent: Jan. 11, 2011

(54) CABLE MODEM LOCATION ANALYZING DEVICE

(76) Inventor: Michael Overcash, 1150 Steeple Run, Lawrenceville, GA (US) 30043

( * ) Notice: Subject to any disclaimer, the term of this patent is extended or adjusted under 35 U.S.C. 154(b) by 365 days.

(21) Appl. No.: 11/676,390

(22) Filed: Feb. 19, 2007

(65) Prior Publication Data

US 2008/0201785 A1 Aug. 21, 2008

(51) Int. Cl.
*H04L 12/26* (2006.01)
(52) U.S. Cl. .................. 370/241; 370/401; 714/25; 725/111; 726/35
(58) Field of Classification Search .............. None
See application file for complete search history.

(56) References Cited

U.S. PATENT DOCUMENTS

2004/0049795 A1* 3/2004 Briggs et al. ............... 725/100
2007/0177614 A1* 8/2007 Siripunkaw et al. ......... 370/401
2007/0276943 A1* 11/2007 Marez et al. ................ 709/225
2008/0120402 A1* 5/2008 Brown ....................... 709/223
2008/0170853 A1* 7/2008 Rakib et al. ................. 398/26

* cited by examiner

*Primary Examiner*—Ayaz R Sheikh
*Assistant Examiner*—Nicholas Sloms
(74) *Attorney, Agent, or Firm*—Merchant & Gould

(57) ABSTRACT

Systems and methods are disclosed according to the implementations of the present disclosure for determining whether a cable modem has been placed in an unauthorized location. One system, among others, comprises a first cable modem and a second cable modem. The first cable modem is configured to transfer data between a first subscriber device and a headend facility and is intended to be used in a first residence. The second cable modem is configured to transfer data between a second subscriber device and the headend facility and is also intended to be used in the first residence. The first cable modem sends first information, corresponding to at least one parameter of the first cable modem, to the second cable modem. The second cable modem compares the first information with second information corresponding to at least one parameter associated with the second cable modem.

25 Claims, 4 Drawing Sheets

CABLE MODEM LOCATION ANALYZING DEVICE

TECHNICAL FIELD

The present disclosure generally relates to cable modems. More particularly, the present disclosure relates to systems and methods for determining whether a cable modem has been placed in an unauthorized location.

BACKGROUND

A multiple service operator (MSO) manages multiple cable systems and can provide cable television service as well as other services, such as access to a data network (Internet) and digital voice telephony. A subscriber of one or more of these services may utilize a cable modem to receive and transmit data within the cable system. Although cable modems can be stand-alone devices, cable modems are often embedded within other devices, such as within a set-top box. The cable modems described in the present disclosure can refer to stand-alone or embedded devices. According to an agreement between the MSO and subscriber, a cable modem, or device having an embedded cable modem, can be leased or purchased for the purpose of accessing the network. Also, the subscriber may lease or purchase additional cable modems to allow multiple users within a residence or household to access the network.

Typically, a first cable modem can be obtained at a first cost, but additional cable modems can be obtained at a greatly reduced cost. The agreement between the MSO and subscriber usually stipulates that the cable modems are to be used only at the subscriber's residence. However, it can be difficult to monitor whether this condition is being met. For example, it might be possible for an unscrupulous subscriber to obtain a number of additional cable modems and improperly sublet some of the cable modems to people at other residences. Of course, this is normally a violation of the MSO/subscriber agreement and essentially steals possible revenue from the MSOs. Thus, a need exists in the industry to address the aforementioned deficiencies and inadequacies to allow an MSO to easily monitor whether a subscriber is improperly placing cable modems in residences other than the residence or billing address of the subscriber.

BRIEF DESCRIPTION OF THE DRAWINGS

Many aspects of the embodiments disclosed herein can be better understood with reference to the following drawings. The components in the drawings are not necessarily to scale, emphasis instead being placed upon clearly illustrating the principles of the present disclosure. Like reference numerals designate corresponding parts throughout the several views.

DETAILED DESCRIPTION

Figure 1:
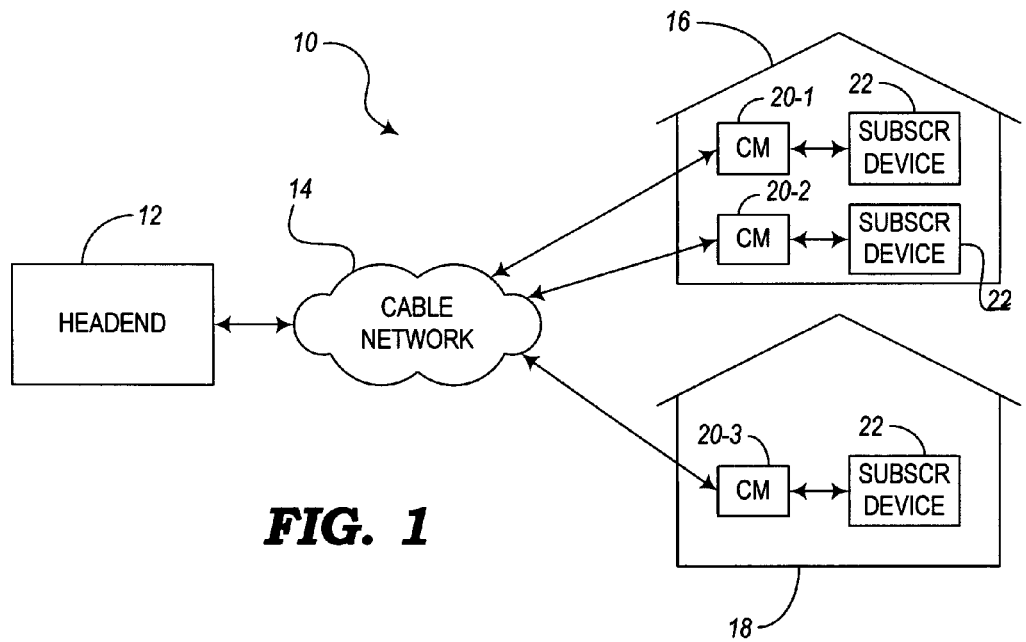
FIG. 1 is a diagram illustrating an embodiment of a cable service system.

FIG. 1 is a diagram illustrating an exemplary cable service system 10. The cable service system 10 includes a headend 12, a cable network 14, a first residence 16, and a second residence 18. The cable network 14 may include any suitable combination of hubs, nodes, switching devices, routing devices, etc., to sufficiently transfer data between the headend 12 and the residences. The cable network 14, for example, may be configured to comply with typical cable service standards, such as the Data-Over-Cable Service Interface Specification (DOCSIS) for broadband data transmission. Alternatively, the cable network 14 may be a Digital Audio Visual Council (DAVIC) network or other suitable data transmission network.

It should be understood that the cable network 14 is configured to be in communication with and manage data transmission to or from a multitude of residences at a multitude of locations. However, in order to simplify the diagram, only two residences are shown. At least one cable modem (CM) 20, or other two-way networking device, may be used within each residence to connect one or more subscriber devices 22 to the cable network 14. Although the CMs 20 are shown as being stand-alone devices, it should be understood that they may be embedded with the subscriber devices 22. Additional equipment may be located between the subscriber devices 22 and the cable network 14, as needed, to properly transfer data. In this embodiment and other embodiments, the subscriber devices 22 may include televisions, personal computers (PCs), digital telephones, multimedia terminal adaptors (MTAs), and/or other one-way or two-way digital devices capable of receiving data from, and in some cases transmitting data to, the headend 12 via the cable network 14.

In this particular arrangement, three cable modems 20-1, 20-2, 20-3 have been obtained for use at the first residence 16. However, as a result of potentially improper placement, one cable modem 20-3 has been positioned at the second residence 18. The misplaced cable modem 20-3 may be located in the second residence 18 due to subletting, sharing, or other reasons that may conflict with an agreement between a multiple service operator (MSO) and the subscriber. In this situation, the MSO, which manages the cable service system 10, may not be able to receive the anticipated total revenue for the services provided. Particularly, the MSO typically charges a higher-tier cost for the service of the first cable modem 20-1 and charges a greatly reduced cost for additional cable modems 20-2 and 20-3 used within a household. However, the service revenue for a higher-tier cable modem is not being received from the second residence 18 in this example because of the improper placement of the additional cable modem 20-3, which was obtained for use within the first residence 16, but is being used instead in the second residence 18.

In the examples of the present disclosure, the term "residence" can refer to a home, office, school, library, hospital, hotel, or other subscriber location where cable services can be received. The cable services, as discussed in the present disclosure, may refer to television services, cable television services, data network access services, Internet services, telephony services, voice over Internet protocol (VoIP) services, e-mail transfer services, and/or other types of services that a subscriber may receive via the cable network 14.

Furthermore, in the present disclosure, the term "cable modem" may be a stand-alone device or may be incorporated within or built into the subscriber device 22. For example, a set-top terminal (STT), set-top box (STB), PC, MTA, or other device may have an embedded cable modem. Regardless of whether the cable modem is located internally or externally to the subscriber device 22, the cable modem enables the subscriber device 22 to communicate with the headend 12 via the cable network 14.

Figure 2A:
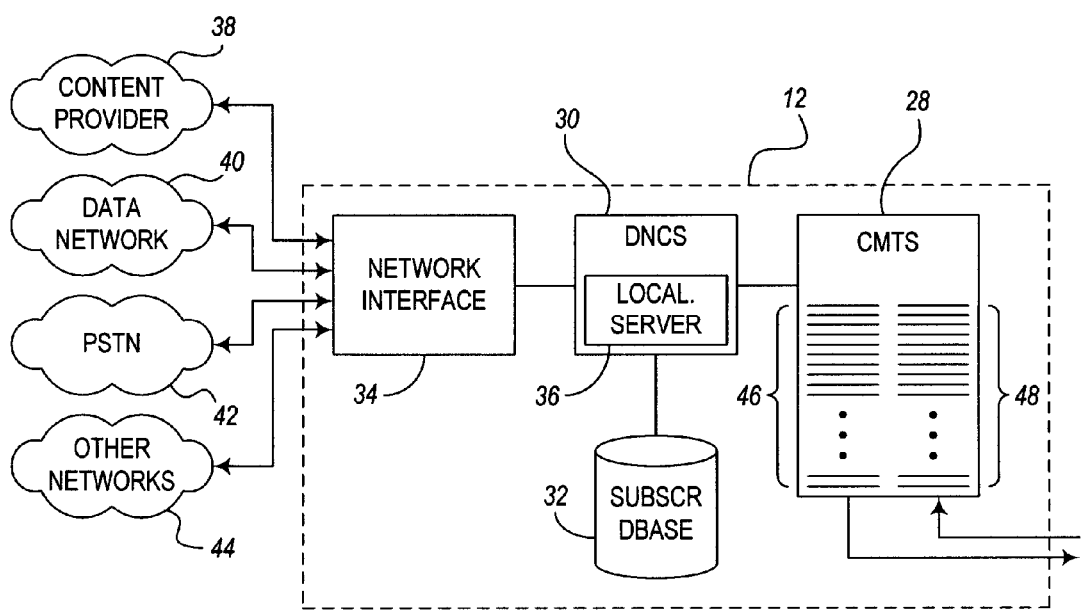
FIGS. 2A and 2B are block diagrams illustrating embodiments of the headend shown in FIG. 1.

FIG. 2A is a block diagram of an embodiment of the headend 12 shown in FIG. 1. In this embodiment, the headend 12 includes a cable modem termination system (CMTS) 28, a digital network control system (DNCS) 30, a subscriber database 32, and a network interface 34. It should be understood that the headend 12 may include additional equipment, which is omitted herein for simplicity. The headend 12 also includes a localization server 36 that serves to monitor the correct placement of cable modems 20 within the cable service system 10. In the embodiment of FIG. 2A, the localization server 36 is incorporated within the DNCS 30. In other embodiments, the localization server 36 may be located within a digital host control protocol (DHCP) server (not shown) within the headend 12.

The network interface 34 may include servers, routers, multiplexing circuitry, demultiplexing circuitry, switching circuitry, for example, to interface the headend 12 with several different networks. For example, as illustrated in FIG. 2A, the network interface 34 can communicate with a content provider 38, a data network 40, a public switched telephone network (PSTN) 42, or other networks 44. The content provider 38 typically provides television programming, which can be transmitted downstream to a subscriber's STT for displaying television programs. The data network 40 may comprise the Internet or any suitable network allowing access to data.

The CMTS 28 includes a plurality of downstream line cards 46 and a plurality of upstream line cards 48. Each downstream line card 46 is capable of transmitting data to dozens or even hundreds of cable modems 20 within a certain geographical area. Each upstream line card 48 is capable of receiving data from dozens or even hundreds of cable modems 20 within a certain geographical area. The CMTS 28 has a unique MAC address, and each downstream line card 46 is assigned a unique downstream channel identifier (DCID) value. The cable modem 20 can use the combination of the MAC address and the DCID value to uniquely identify the particular downstream line card 46 within the cable service system 10. The upstream line cards 48 can be identified by an upstream channel identifier (UCID).

In addition to the CMTS 28, the headend may include other devices for interfacing the cable network 14. For example, the headend 12 may include a quadrature amplitude modulation (QAM) modem, a digital multiplex system (DMS), or other devices for communication with the subscriber devices 22. The CMTS 28 may be configured as a cable network interface or headend router device, such as a quadrature phase shift keying (QPSK) modem. Also, in the present disclosure, the CMTS 28 may be configured to allow communication between cable modems 20 while bypassing the data network 40.

Figure 2B:
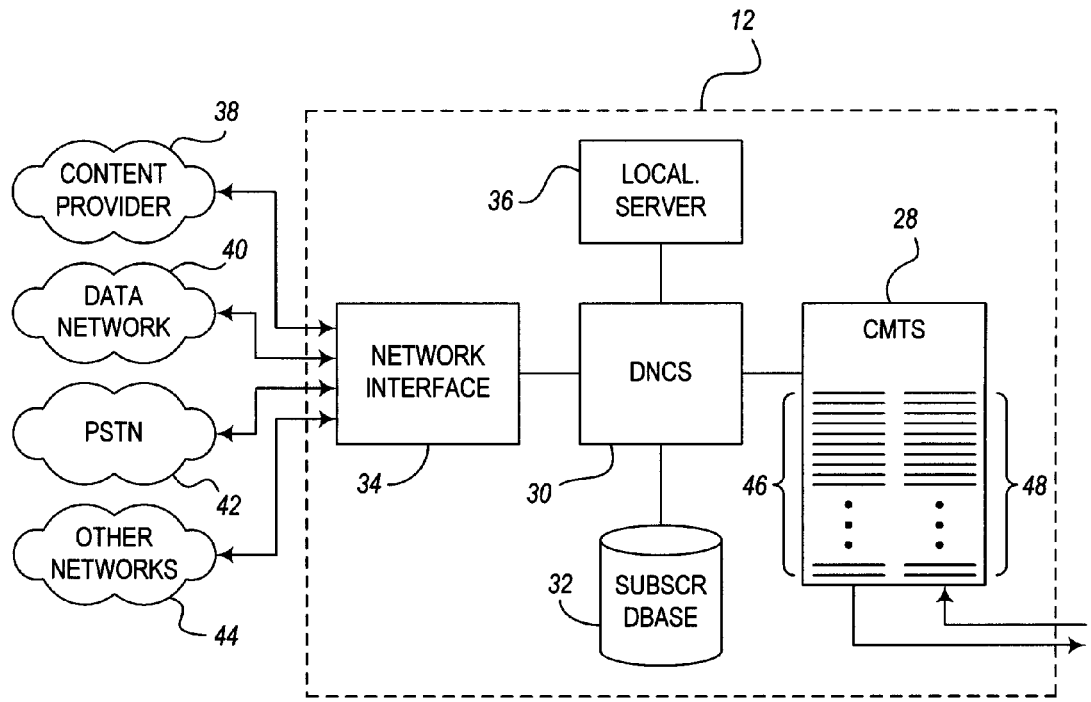

FIG. 2B is a block diagram of another embodiment of the headend 12. In the embodiment of FIG. 2B, the headend 12 includes substantially the same arrangement as in FIG. 2A, except that the localization server 36 is configured as a stand-alone device located outside the DNCS 30. In this embodiment, the localization server 36 operates in coordination with the CMTS 28, DNCS 30, subscriber database 32, and DHCP server (not shown) to monitor cable modem placement.

With reference to FIGS. 1, 2A, and 2B, a system, referred to herein as a cable modem location analyzing system, includes the combination of the cable modems 20 and the localization server 36. Such a system can be configured with additional software programs allowing the system to operate according to the teachings herein. With the software being executed by processing devices within the components, the system of cable modems 20 and localization server 36 can determine whether a cable modem has been placed in an unauthorized location. The operations and functions of the cable modem location analyzing system are described below.

The DNCS 30 essentially controls the operations of the headend 12. The DNCS 30 can monitor when cable modems 20 are installed, or are to be installed, within respective residences or when a service plan is established. The localization server 36 associates each cable modem 20 to a particular billing address or subscriber residence where the cable modems are to be placed. The localization server 36 collects and analyzes reports from the cable modems 20, as described in more detail below, when it is suspected that a cable modem 20 has been placed in an unauthorized location.

It has been proposed to increase the capacity of the subscriber database 32 to store information regarding the location and other characteristics of every cable modem 20 in the cable service system 10. Such a centralized database could be used to determine if a cable modem has been moved to an unauthorized location. However, this solution may result in an extremely large database that would be rather unwieldy. Also, the parameters of the cable modems, such as propagation information, can change over time due to temperature changes, wind, or other environmental conditions. It would be extremely difficult for the database 32 capable of storing such a large amount of data to adjust to these changes. Therefore, other solutions are preferred and disclosed herein to avoid overloading the database 32 or headend 12.

Another way in which the placement of cable modems can be monitored is by designing the cable modems themselves to determine on their own if a peer has been placed in a different location. Then, when one of the cable modems suspects that its peer is in an unauthorized location, the cable modem can inform the localization server 36 of the potential issue. In this way, the cable modems share the load and only inform the localization server 36 when there seems to be a problem. In this disclosure, the term "peer" refers to a cable modem that is intended to be used at the same location as a particular cable modem. Referring to FIG. 1, for example, cable modems 20-1, 20-2, and 20-3 are peers of each other, although one of the peers (cable modem 20-3) has been improperly placed in another residence.

The localization server 36 can be designed to store the MAC addresses of the devices located within the cable service system 10. Also, the localization server 36 can retrieve information regarding which devices, having specific MAC addresses, are to be located at the same residence. During an initialization stage, a cable modem and/or its peers may be assigned new IP addresses. The initialization stage may take place, for example, when a cable modem is first installed, when it first reboots, when its peers are first installed or rebooted, when its peers change, when a service plan has been changed, renewed, expired, or during other various events.

The localization server 36 may be integrated with the DHCP server or can query the DHCP server or CMTS 28 to look up the IP addresses for the cable modems. In this manner, the localization server 36 can distribute cable modem IP addresses during the initialization stage. The MAC address and corresponding IP address information can then be stored. The cable modem is configured to request for the IP address information during the initialization stage. In response, the localization server 36 informs the particular cable modem of its IP address, whether the cable modem has any peers, and the IP addresses of the peers (if any). In addition, when the localization server 36 sends this information, it also sends a schedule of when the cable modem is to check the location of its peers. The schedule, for example, may establish a particular time during a week or several times during a week in which a "peer-to-peer check" is to be performed. Normally, it would not be necessary for each cable modem to be scheduled to make peer-to-peer checks too often, since this may result in an unacceptable increase in traffic in the cable service system 10.

In some implementations, the cable modem may store an identification string, such as a "HomeID", which represents a specific residence. All cable modems to be used within that residence store the same identification. The HomeID can be used to simplify the requests to the localization server 36. The localization server 36 in this case can inform the requesting cable modem of its peers based on those cable modems having the same HomeID.

The localization server 36 includes a master schedule that lists when every cable modem is to periodically check with its peers. The master schedule may take into account the times of the week that the cable service system 10 is not too active. During its respective scheduled time, a cable modem can perform the peer-to-peer check with each of its peers according to any one of several processes. Each cable modem that has at least one peer is given its own schedule and initiates the peer-to-peer check according to the schedule. Also, each cable modem that has at least one peer may respond to a peer's initiation of the check. Therefore, each of the peers may at times act as the initiating cable modem and at other time act as the peer cable modem.

One process for performing the peer-to-peer check, for example, uses information that can be gathered from the CMTS 28 to detect its general location. This information can be compared with similar information corresponding to its peer to determine if they match. If the location information does not match, then it can be concluded that one of the two peers is located in an unauthorized location.

In another process of the peer-to-peer check, the cable modem may determine a DOCSIS timing offset value and compare this value with similar information corresponding to its peer. In this process, each cable modem that has a peer sends a signal to the CMTS 28 and a propagation delay from the cable modem to the CMTS 28 is determined. This delay time is synchronized with a master clock of the CMTS 28 to ensure accuracy. The cable modem 20 can then send its timing offset value to its peers for comparison. Cable modems located in the same residence should have substantially similar timing offsets. However, if the timing offsets differ by more than a predetermined amount, then it can be determined that one of the cable modems has been moved to an unauthorized location.

In these or other processes for performing a peer-to-peer check, information is transmitted from a first cable modem to its peer or peers. The peers can compare the information with expected information to determine whether one of the cable modems is likely in an unauthorized location. In alternative embodiments, the process may begin with a cable modem requesting that its peer send information back to the cable modem for analysis. In this case, the initiating cable modem performs the comparison and most of the other peer-to-peer functions.

According to some embodiments, a cable modem can analyze transmission information of data packets to determine which downstream line card 46 and upstream line card 48 the cable modem is connected to. The downstream line cards 46 can be identified by the combination of their DCID values and their MAC addresses. The upstream line cards 48 can be identified by their UCID values. Each downstream line card 46 and upstream line card 48 would normally be connected to all the cable modems within the same residence. However, if the peer-to-peer check uncovers that a peer's information does not match its own, then it can be determined that one of the cable modems has likely been moved to an unauthorized location.

The identity of the downstream line card 46 can be determined by obtaining the DCID and the MAC address of the CMTS 28. The identity of the upstream line card 48 can be determined by a process referred to as "ranging", where a cable modem can determine which upstream channel to use. By analyzing the UCID, the cable modem can determine which channel it should be on and which upstream line card 48 is used for that channel. The combination of the DCID of the downstream line card 46, MAC address of the downstream line card 46, and the UCID of the upstream line card 48 is referred to herein as "localization information". In some implementations, the localization information may also include an identification of a hub within the cable network 14. By communicating the localization information to a peer, a comparison can be made between peer cable modems to determine if there is a difference. If so, then it is very likely that one cable modem has been improperly placed at an unauthorized location.

When a cable modem that makes the information comparison determines that there is a difference, the cable modem sends a "red alert" to the localization server 36 indicating that the locations of the cable modem and its peer appear to be different. In this case, the localization server 36 may react in a variety of ways. For instance, the localization server 36 may print a report of the violation, notify a person working for the MSO to contact the subscriber, notify a field technician to check the situation, etc. Furthermore, additional action can be taken, such as sending a communication to the subscriber as a warning, invoking a penalty, charging back-fees, allowing the subscriber to change to a different payment plan, terminate service to the subscriber, etc.

Instead of sending a red alert the first time a potential problem is observed, the cable modem 20 may wait until the potential problem occurs a number of times. Then, after one or more additional confirmations of the problem, a red alert is sent. Alternatively, the cable modem 20 may report every red alert and the localization server 36 may store the red alert and wait to see if the violations continue. In this latter case, the localization server 36 may respond only after the violations have occurred a certain number of times.

Another potential problem that may be detected by the cable modems during the peer-to-peer check is when the peer does not respond to an inquiry. If the cable modem does not receive an expected response from its peer to indicate that the peer received the information from the cable modem, then the cable modem sends a "yellow alert" to the localization server 36. The yellow alert merely serves as a warning that there may be a problem. However, this alert may actually be a false alarm if the peer is simply disconnected from the network or turned off. On the other hand, the peer may be located in a residence that may not be reachable by the cable modem.

If the localization server 36 receives a yellow alert from a first peer (when it performs its peer-to-peer check) and another yellow alert from a second peer (when it performs its peer-to-peer check), then the localization server 36 can conclude that one of the peers has likely been moved elsewhere. The localization server 36 saves the yellow alerts and attempts to combine matching alerts to determine if such a potential problem exists. If a problem is uncovered, the localization server 36 may respond as it would for a red alert as mentioned above. Also, the localization server 36 may wait until it determines a potential problem a number of times to confirm that a problem is likely legitimate, and respond accordingly thereafter.

Figure 3:
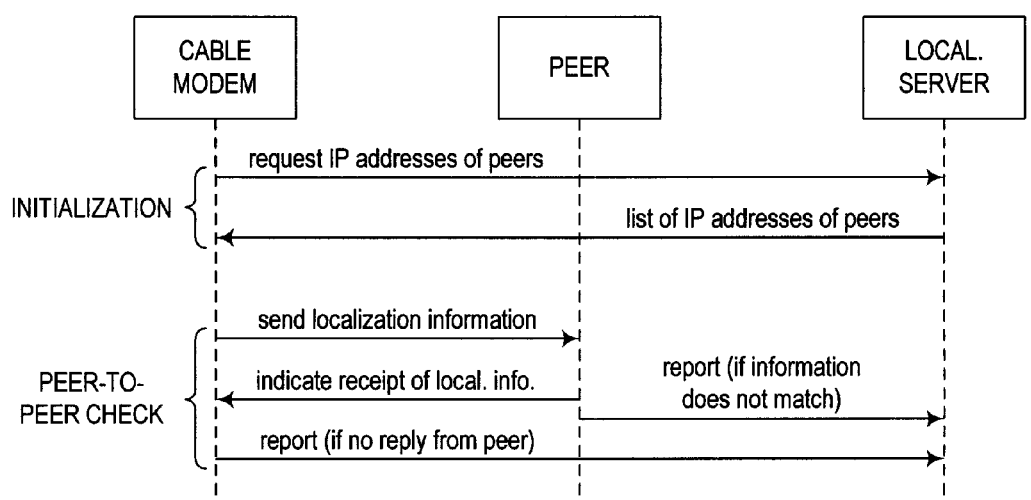
FIG. 3 is a diagram illustrating an example of signal transmissions within the cable service system of FIG. 1.

FIG. 3 is a diagram illustrating examples of possible communication between the cable modems and localization server 36 for monitoring placement of one or more cable modems in potentially unauthorized locations. The cable modems can alert the localization server 36 when one or more cable modems may be improperly placed in an unauthorized location.

The diagram of FIG. 3 shows an initialization process and an example of a possible peer-to-peer check that can be made. In the initialization process, such as when a cable modem or one of its peers is initially installed in a particular residence, the cable modem can be designed to determine its IP address and the IP addresses of its peers (if any). The cable modem sends an address resolution protocol (ARP) request to the CMTS 28, which can act as a gateway router, to determine the MAC address that should be used when sending messages to the localization server 36. In this way, the cable modem requests the IP addresses of itself and its peers (if any).

In response, the localization server 36, which stores the MAC addresses of the cable modems, requests the IP addresses from the DHCP server using a special protocol. The localization server 36 can then send a list of the requested IP addresses for the corresponding MAC addresses. Since the IP addresses are dynamic, the localization server 36 can inform the cable modems of new IP addresses when a cable modem is first installed, first powered up, when a lease expires, etc. When a cable modem has at least one other peer, the localization server 36 also sends a schedule of when the cable modem is to check for potential location issues with respect to its peers.

In one implementation of the peer-to-peer check, as illustrated in FIG. 3, a cable modem sends its localization information to its peer. If it has more than one peer, then the information is sent to all peers for similar processing. The peer is designed to be ready to receive this information at all times. When it does receive it, the peer compares the localization information with its own. If the information is the same, indicating that the two cable modems are likely in the same residence or at least in the same general vicinity, then the cable modems are determined to be located properly.

If the location comparison appears to be acceptable, then no alert is sent to the localization server 36. However, if the peer determines that the localization information of the cable modem is different from its own localization information, then the peer sends a report to the localization server 36 to inform it that there could possibly be a problem. As mentioned above, the localization information represents the identity of a downstream line card and upstream line card servicing a particular cable modem. The boundary around a group of residences serviced by a particular downstream line card or upstream line card can be arbitrary. Regardless, when a cable modem has been moved outside this boundary, the difference in the DCID, downstream MAC address, and/or UCID information can be observed.

In addition, when the peer receives the localization information from the first cable modem, the peer sends a response back to the cable modem to inform the cable modem that the localization information has been received. This response lets the cable modem know that the peer received the information and is still operating on the network. Otherwise, if the cable modem does not receive the response from the peer, the cable modem can determine that the peer is unreachable. The peer may be unreachable because it has been removed from the network, either by disconnection or being turned off. Another reason for a peer not responding may be a result of the peer being moved to a location in the network that is outside the reach of the first cable modem. If the peer is determined to be unreachable, the cable modem informs the localization server 36 that the peer has not responded.

It should further be noted that the signals transmitted between the cable modems may be encrypted to ensure that the messages between the cable modems are not tampered with or that the messages do not come from an imposter. One method of encryption is to append a message integrity check (MIC) to each message. To do this, the cable modem sending the message uses a hash algorithm to calculate a hash value for the message. The hash value is encrypted using a private key. The encrypted hash value is then sent with the rest of the message and the actual contents of the message remain unencrypted. The receiving cable modem uses a public key to decrypt the hash and uses the same hash algorithm to calculate its own hash. If the values match, the message is authentic. The public key can be known or can be sent with the original message.

Figure 4:
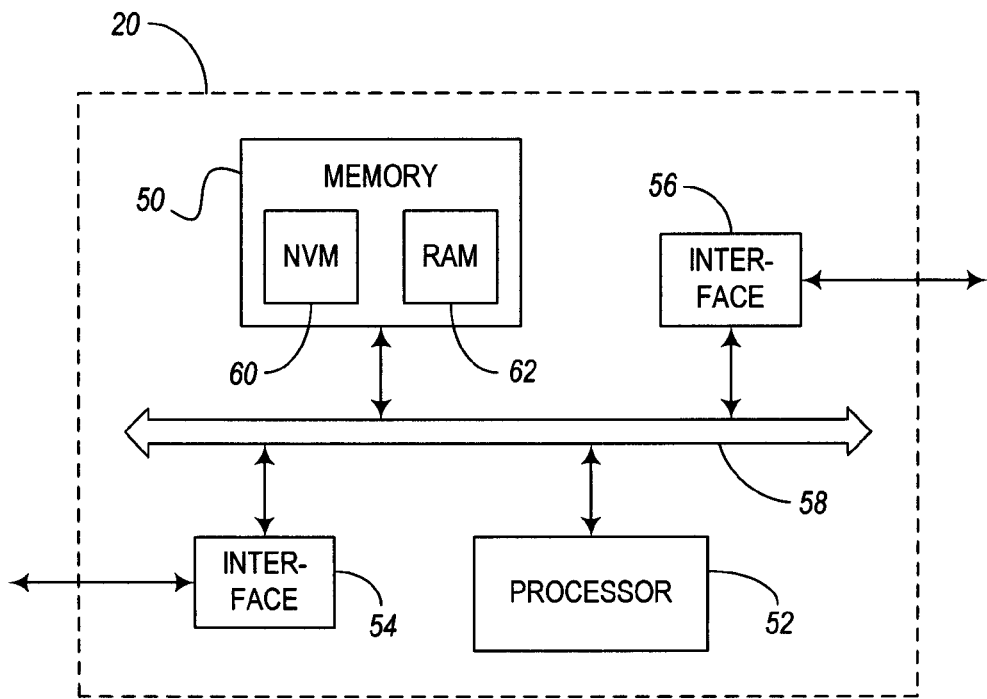
FIG. 4 is a block diagram illustrating an embodiment of one of the cable modems shown in FIG. 1.

FIG. 4 is a block diagram of an embodiment of one of the cable modems 20 shown in FIG. 1. The cable modem 20 in this configuration includes a memory device 50, a processor 52, a first interface 54, and a second interface 56, each component of which is connected to an internal bus 58. The memory device 50 includes at least non-volatile memory (NVM) 60 and random access memory (RAM) 62.

The first interface 54 is configured to be in communication with the cable network 14, either via transmission lines or wireless communication components. For example, the first interface 54 may additionally include a tuning system, signal processor, etc. The second interface 56 is configured to be in communication with the subscriber device 22 via transmission lines or wireless communication components. The second interface 56 may include a display driver for controlling a display device, e.g. a television. The second interface 56 may further include a frame buffer or other memory as needed.

The NVM 60 may include flash memory, EEPROM, or other suitable types of non-volatile memory. The NVM 60 may be configured to store an operating system, drivers, graphical user interface, television channel navigator, etc. Also, the NVM 60 may include software for performing peer-to-peer checks for determining whether its peer is located in an unauthorized location. The RAM 62 may be dynamic RAM (DRAM) and may be configured to store an interactive program guide, drivers, etc.

When the cable modem is first installed, it is configured to find out whether it has any peers and, if so, the IP addresses of its peers. The cable modem may be designed with an initialization program stored in NVM 60 for initializing the cable modem. The processor 52 controls the cable modem to perform various processes, including performing the initialization according to the initialization program. In accordance with the initialization procedure shown in FIG. 3, for example, the processor 52 sends a signal, which includes its MAC address, via the interface 54 to the localization server requesting information regarding its IP address and the IP addresses of its peers. When the cable modem receives the IP addresses from the localization server, this information is stored in NVM 60. The cable modem also receives a schedule of when to contact its peers. This information is also stored in NVM 60.

The memory 50 of the cable modem 20 may be configured, in other embodiments, to store a software program in NVM 60 for calculating a timing offset based on a propagation delay of a signal transmitted from the cable modem to the CMTS 28. Also, the program is configured to receive the timing offset from its peers and can calculate the difference in the timing offset values. If the difference is greater than a predetermined threshold, then it can be likely assumed that the cable modem and its peer are located at different residences. The program can notify the localization server 36 when the timing offset difference exceeds the threshold. As mentioned above, the timing offsets can be synchronized with a master clock to ensure accuracy.

In some embodiments, the NVM 60 may be configured to store a software program that is capable of performing several different implementations of the peer-to-peer check, such as the implementations mentioned above. In this case, if a problem is discovered using any one of the different implementations, then an indication of such a problem can be sent to the localization server 36 for further processing. Other embodiments may include using one or more of the different implementations according to specific instructions from the headend 12. Also, the programs described herein may be downloaded from the headend 12 during scheduled broadcasts. Also, updates to the programs may also be downloaded when needed.

Figure 5:
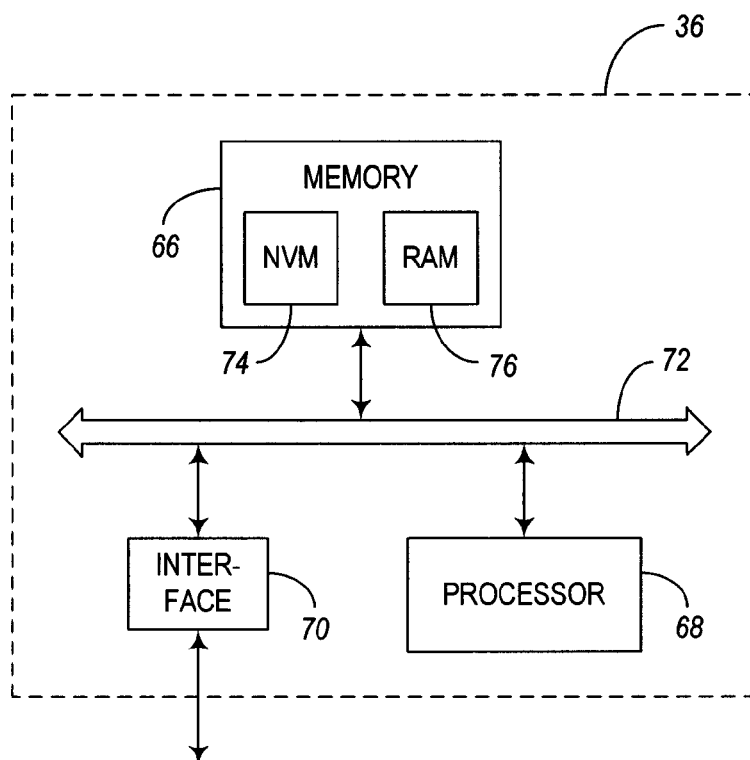
FIG. 5 is a block diagram illustrating an embodiment of the localization server shown in FIGS. 2A and 2B.

FIG. 5 is a block diagram of an embodiment of the localization server 36 as shown, for example, in FIG. 2A or 2B. The localization server 36 includes a memory device 66, a processor 68, and an interface 70, each component of which is connected to an internal bus 72. The interface 70 is configured to be in communication with the CMTS 28, DNCS 30, and subscriber database 32.

The NVM 74 of the localization server 36 includes a software program to store the MAC addresses of cable modems in the system. Also, the NVM 74 stores the relationship of cable modems that are intended to be used within the same residence. When cable modems are first installed, the program can respond to requests by sending a list of IP addresses of the cable modem and its peers. The localization server 36 may alternatively use the assistance of the CMTS 28, DNCS 30, and/or a DHCP server (not shown) to determine IP addresses. When a cable modem has at least one peer, the program in memory 66 schedules one or more times during a week when the cable modem is to perform the peer-to-peer checks as mentioned above. These actions represent the initialization stage of a cable modem.

During a cable modem's peer-to-peer check, the program in memory 66 is also designed to receive alerts from the cable modems when it is suspected that a cable modem has been placed in an unauthorized location. The memory 66 stores the alerts and the processor 68 can respond to the alerts accordingly. When the system is operating in the timing-offset configuration, the program within NVM 74 responds to alerts in substantially the same manner.

The peer-to-peer checking systems, also referred to herein as cable modem location analyzing systems, which determine whether a cable modem has been placed in an unauthorized location, are defined in the present disclosure with respect to FIGS. 1-5. These systems can be implemented in hardware, software, firmware, or a combination thereof. The peer-to-peer checking systems can be implemented in software or firmware that is stored in a memory and that is executed by a suitable instruction execution system. The peer-to-peer checking systems can also be implemented in hardware with any combination of discrete logic circuitry, an application specific integrated circuit (ASIC), a programmable gate array (PGA), a field programmable gate array (FPGA), etc.

Figure 6:
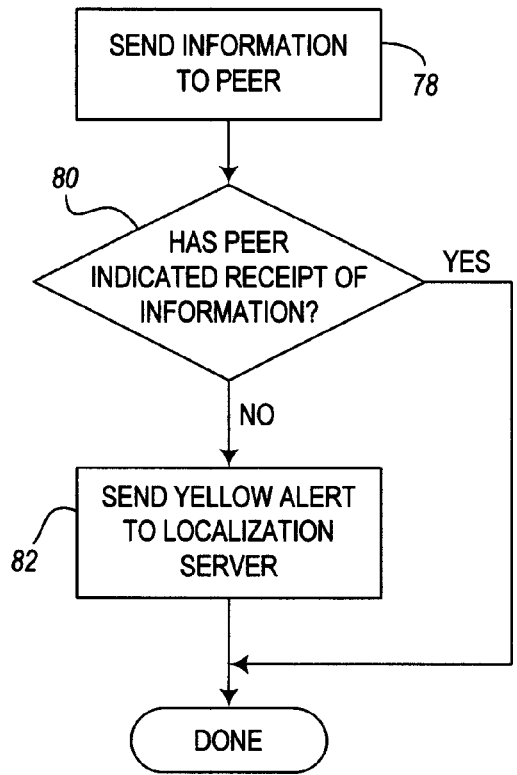
FIG. 6 is a flow chart illustrating an embodiment of an operational process of a cable modem initiating a peer-to-peer check.

FIG. 6 is a flow chart illustrating an embodiment of a process of operation of a cable modem that initiates a peer-to-peer test. In block 78, the cable modem sends information to its peer. In some embodiments, the information may be localization information representing an identification of the downstream line card and upstream line card that are servicing the cable modem. The localization information may also include a hub ID. The information mentioned in block 78 may, in other embodiments, represent a timing offset value related to the propagation time for a signal to travel from the cable modem to the CMTS.

In decision block 80, it is determined whether or not the peer has responded by indicating that it received the cable modem's information. This decision may be delayed a sufficient amount of time to allow the peer to respond. If it is determined in block 80 that the peer has responded, then the process of FIG. 6 is done. If the peer does not respond, however, a yellow alert is sent to the localization server, as indicated in block 82. The yellow alert represents a warning to the localization server that the peer cannot be contacted.

Figure 7:
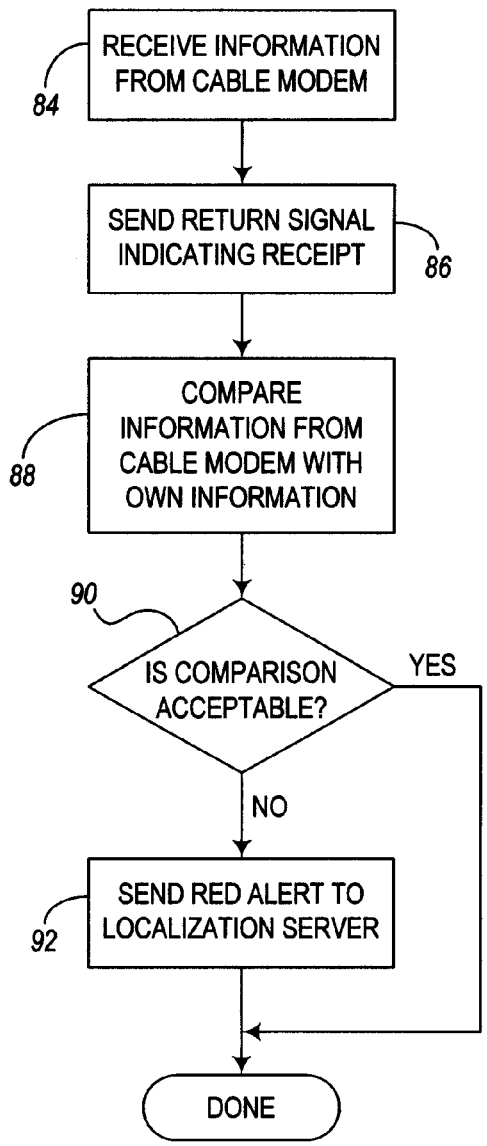
FIG. 7 is a flow chart illustrating an embodiment of an operational process of a cable modem performing a peer-to-peer check corresponding to the process of FIG. 6.

FIG. 7 is a flow chart illustrating an embodiment of a process of operation of the cable modem 20 acting as the peer device when another cable modem 20 initiates the peer-to-peer check. In this embodiment, the peer cable modem receives the information from another cable modem, as indicated in block 84. In block 86, a return signal is sent back to the other cable modem indicating that the information has been received. In block 88, the information sent from the other cable modem is compared with its own localization information. The comparing process described in block 88, for example, can represent a comparison of initialization information of the cable modem with the peer's initialization information. The initialization information may include the DCID, downstream line card MAC address, and the UCID, and may also include the hub identification. In other alternative implementations, block 88 may represent a comparison of a peer's timing offset value with its own. The timing offset values can be compared by computing a difference between them.

According to decision block 90, it is determined whether the comparison process with respect to block 88 has acceptable results. For example, if the localization information for both cable modems is the same or the information is that which would be expected, then the results are considered to be acceptable. When the comparison in block 88 is related to the difference in timing offset values, decision block 90 may include determining whether or not this difference exceeds a predetermined threshold time. If the difference is within acceptable tolerances, then it is considered to be acceptable. If the difference exceeds the threshold, it can be suggested that the cable modems are not located within the same residence and are placed improperly.

If the information comparison is acceptable, then the process of the peer cable modem is done. Otherwise, when the comparison is determined to be unacceptable in decision block 90, the process includes sending a red alert to the localization server, as indicated in block 92. The red alert informs the localization server that the information does not fall within acceptable limits, thereby indicating that the two cable modems are not likely within the same proximity.

The flow charts of FIGS. 6 and 7 show the architecture, functionality, and operation of possible implementations of the peer-to-peer checking software and/or cable modem location analyzing software. In this regard, each block can represent a module, segment, or portion of code, which comprises one or more executable instructions for implementing the specified logical functions. It should also be noted that in some embodiments, the functions noted in the blocks may occur out of the order as noted or illustrated. For example, two blocks shown in succession may be executed substantially concurrently or the blocks may sometimes be executed in the reverse order, depending upon the functionality involved, as will be appreciated by one of ordinary skill in the art.

The peer-to-peer checking programs and/or cable modem location analyzing programs may comprise an ordered listing of executable instructions for implementing logical functions. In this respect, these programs can be embodied in any computer-readable medium for use by an instruction execution system, apparatus, or device, such as a computer-based system, processor-controlled system, or other suitable system. In the context of this document, a "computer-readable medium" can be any medium that can contain, store, communicate, propagate, or transport the program for use by the instruction execution system, apparatus, or device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:

1. A system comprising:
   a first cable modem configured to transfer data between a first subscriber device and a headend facility, the first cable modem intended to be used in a first residence; and
   a second cable modem configured to transfer data between a second subscriber device and the headend facility, the second cable modem intended to be used in the first residence;
   wherein the first cable modem is further configured to send first information to the second cable modem, the first information corresponding to at least one parameter associated with the first cable modem;
   wherein the second cable modem is further configured to compare the first information with second information, the second information corresponding to at least one parameter associated with the second cable modem, wherein the first and second information include an identification string associated with a specific residence, wherein the comparisons are made at times specified in a master schedule maintained by a localization server; and
   wherein the localization server sends a relevant portion of the master schedule to each of the first cable modem and the second cable modem.

2. The system of claim 1, wherein the localization server is located within the headend facility.

3. The system of claim 2, wherein the second cable modem is further configured to send a first alert to the localization server when the comparison between the first information and second information is unacceptable.

4. The system of claim 3, wherein the localization server responds to the first alert by performing at least one process of the group of processes consisting of administering a fine to a subscriber, allowing the subscriber to change service plans, and notifying a person to physically check the location of the first and second cable modems.

5. The system of claim 2, wherein the second cable modem is further configured to send a response to the first cable modem indicating receipt of the first information.

6. The system of claim 5, wherein the first cable modem is further configured to send a second alert to the localization server if the first cable modem does not receive the response from the second cable modem.

7. The system of claim 2, wherein the localization server is incorporated within a digital network control system (DNCS).

8. The system of claim 2, wherein the localization server stores MAC addresses of the first and second cable modems and stores an indication that the first and second cable modems are intended to be used in the same residence.

9. The system of claim 8, wherein the localization server assigns IP addresses to the first and second cable modems and informs the first and second cable modems that they are intended to be used in the same residence.

10. The system of claim 1, wherein the first information and second information include localization information, the localization information including a source MAC address of a cable modem termination system (CMTS) servicing the respective cable modem and an upstream line card identification (UCID) of the CMTS servicing the respective cable modem.

11. The system of claim 10, wherein the localization information further includes an identification of a hub servicing the respective cable modem.

12. The system of claim 1, wherein the first information includes a first timing offset based on a first propagation time of a signal transmitted from the first cable modem to a cable modem termination system (CMTS) and the second information includes a second timing offset based on a second propagation time of a signal transmitted from the second cable modem to the CMTS.

13. The system of claim 12, wherein the second cable modem is configured to calculate the difference between the first timing offset and the second timing offset.

14. A method comprising the steps of:
   receiving, at a first cable modem, information related to the location of a second cable modem, whereby the first cable modem and second cable modem are intended to be installed at the same residence;
   comparing the location information of the second cable modem with location information of the first cable modem, wherein the location information includes an identification string associated with a specific residence, wherein the comparisons are made at times specified in a master schedule maintained by a localization server, and wherein the localization server sends a relevant portion of the master schedule to each of the first cable modem and the second cable modem;
   sending a warning to a subscriber responsible for service payments on the second cable modem; and
   sending an alert to a headend when the location information of the second cable modem is different from the location information of the first cable modem.

15. The method of claim 14, further comprising the step of:
   requesting, before receiving the information related to the location of the second cable modem, IP addresses of cable modems intended to be installed at the same residence as the first cable modem.

16. The method of claim 15, wherein the step of requesting IP addresses comprises requesting IP addresses when the first cable modem is initially installed in the residence.

17. The method of claim 14, further comprising the step of:
sending a request from the first cable modem to the second cable modem, the request corresponding to a request for the location information of the second cable modem.

18. The method of claim 14, further comprising the step of:
sending the location information of the first cable modem to the second cable modem.

19. The method of claim 14, further comprising the step of:
sending a confirmation signal to the second cable modem indicating receipt of the location information of the second cable modem.

20. A cable modem comprising:
memory configured to store first information, the first information related to at least one parameter of the cable modem, the memory further configured to store a peer-to-peer checking program, the peer-to-peer checking program including logic configured to determine if a peer cable modem, intended to be placed in a particular location, has been placed in an unauthorized location; and a processor configured to execute the peer-to-peer checking program;

wherein the peer-to-peer checking program further comprises logic configured to compare second information, related to at least one parameter of the peer cable modem, with the first information, wherein the first and second information include an identification string associated with a specific residence;

wherein the peer-to-peer checking program further comprises logic configured to make the comparisons at times specified in a master schedule maintained by the peer-to-peer checking program, wherein the peer-to-peer checking program sends a relevant portion of the master schedule to each of the cable modem and the peer cable modem.

21. The cable modem of claim 20, wherein the first information and second information includes localization information, the localization information related to information corresponding to a general location of the respective cable modem.

22. The cable modem of claim 21, wherein the localization information corresponds to an identification of a downstream line card and an upstream line card connected to a respective cable modem.

23. The cable modem of claim 22, wherein the localization information further corresponds to an identification of a hub connected to the respective cable modem.

24. The cable modem of claim 20, wherein the first information includes a timing offset value associated with a transmission time of a signal from the cable modem to a cable modem terminal system (CMTS) and the second information includes a timing offset value associated with a transmission time of a signal from the peer cable modem to the CMTS.

25. The cable modem of claim 20, wherein the peer-to-peer checking program further comprises logic configured to send the first information to the peer cable modem at a scheduled time.

* * * * *